US010076990B2

(12) United States Patent
Vink, Jr. et al.

(10) Patent No.: US 10,076,990 B2
(45) Date of Patent: Sep. 18, 2018

(54) DRAG WINCH ASSEMBLY FOR A TOW VEHICLE INCLUDING A SLIDABLE BOOM ASSEMBLY AND METHOD OF OPERATING THE SAME

(71) Applicant: INDUSTRIES N.R.C. INC., Saint-Paul-d'Abbotsford (CA)

(72) Inventors: Hubert Vink, Jr., Vankleek Hill (CA); Benoit Landelle-Théberge, Saint-Hyacinthe (CA); Normand Caron, St-Paul d'Abbotsford (CA)

(*) Notice: Subject to any disclaimer, the term of this patent is extended or adjusted under 35 U.S.C. 154(b) by 145 days.

(21) Appl. No.: 14/943,731

(22) Filed: Nov. 17, 2015

(65) Prior Publication Data
US 2016/0137120 A1 May 19, 2016

Related U.S. Application Data

(60) Provisional application No. 62/080,758, filed on Nov. 17, 2014.

(51) Int. Cl.
| | |
|---|---|
| *B60P 3/12* | (2006.01) |
| *B60P 1/54* | (2006.01) |
| *B66D 1/28* | (2006.01) |
| *B66C 23/62* | (2006.01) |

(52) U.S. Cl.
CPC ............... *B60P 3/12* (2013.01); *B60P 1/5457* (2013.01); *B60P 1/5466* (2013.01); *B66C 23/62* (2013.01); *B66D 1/28* (2013.01)

(58) Field of Classification Search
CPC ......... B60P 3/28; B60P 1/5438; B60P 1/5457; B60P 1/5461; B60P 1/5466; B66D 1/28; B66D 1/60; B66D 1/62; B66D 3/20; B66C 23/36; B66C 23/38; B66C 23/40; B66C 23/46; B66C 2700/0357; B66C 2700/0364
See application file for complete search history.

(56) References Cited

U.S. PATENT DOCUMENTS

| | | | | |
|---|---|---|---|---|
| 2,292,870 A | * | 8/1942 | Dixon | B60P 1/5457 212/180 |
| 2,701,655 A | * | 2/1955 | Crile | B60P 1/5457 212/320 |
| 2,746,619 A | * | 5/1956 | Kuhlenschmidt | B60P 1/5457 414/542 |
| 4,687,376 A | * | 8/1987 | Recalde | F16L 1/202 405/166 |

(Continued)

FOREIGN PATENT DOCUMENTS

GB 2061193 A * 5/1981 ............. B60P 3/125

*Primary Examiner* — Glenn F Myers
(74) *Attorney, Agent, or Firm* — Benoit & Cote, Inc.; C. Marc Benoit

(57) ABSTRACT

A drag winch assembly for a tow vehicle, such as a wrecker, that includes a slidable boom assembly. The drag winch assembly comprises a slidable support connected to the slidable boom assembly in slidable engagement with the main frame of the wrecker and a drag winch mounted on the slidable support. With this configuration, the slidable support is slidable between a first position corresponding to the frontmost position of the slidable boom assembly and a second position corresponding to the rearmost position of the slidable boom assembly, providing advantages existing winch assembly configurations.

8 Claims, 11 Drawing Sheets

(56) References Cited

U.S. PATENT DOCUMENTS

| | | | | |
|---|---|---|---|---|
| 4,790,710 A | * | 12/1988 | Ayalon | B60P 3/125 |
| | | | | 280/764.1 |
| 6,092,975 A | * | 7/2000 | Cannon, Jr. | B60P 3/12 |
| | | | | 212/302 |
| 2002/0117654 A1 | * | 8/2002 | Bartal | B66D 1/00 |
| | | | | 254/323 |
| 2014/0037411 A1 | | 2/2014 | McConnell | |

* cited by examiner

DRAG WINCH ASSEMBLY FOR A TOW VEHICLE INCLUDING A SLIDABLE BOOM ASSEMBLY AND METHOD OF OPERATING THE SAME

CROSS-REFERENCE TO RELATED APPLICATIONS

This application claims priority from U.S. provisional patent application No. 62/080,758, filed on Nov. 17, 2014, the specification of which is hereby incorporated by reference.

BACKGROUND (a) Field

The subject matter disclosed generally relates to tow vehicles or to wreckers. More particularly, the subject matter disclosed relates to drag winch assemblies for tow vehicles which include slidable boom assemblies and to methods of operating the same.

(b) Related Prior Art

Nowadays, a traditional tow vehicle or wrecker for heavy loads generally has two functions. The first one is to lift a wrecked object with an underlift, to ensure it is fixed to the underlift and then to move such wrecked object out of a traffic artery or area. The second one is to hang a wrecked object from a boom assembly and to transfer it to a new site suitable for successive operations (i.e., lift the wrecked object with the under lift, fix the wrecked object and the like).

As shown in prior art FIGS. 1 and 2, a conventional tow vehicle or wrecker 10 for heavy loads may include a main frame 12 and a boom assembly 14 which has a first end (bottom end) 16 and a second end (top end) 18. The boom assembly 14 is either fixed, i.e. unable to rotate, or pivotably mounted at its first end 16 to the main frame 12 of the wrecker 10 such as to allow the second end 18 of the boom assembly 14 to displace, at least up and down (and optionally left and right), relative to the first end 16. Accordingly, the boom assembly 14, which defines a boom longitudinal axis 20, may pivot between a horizontal position, where the boom longitudinal axis 20 is substantially parallel to a ground surface, and a vertical position, where the boom longitudinal axis is substantially perpendicular to the ground surface.

At its second end 18, or about its second end 18, the boom assembly 14 further includes a pulley assembly 22 which is rotatably mounted about a pulley axis 24 for receiving a lifting cable 26. The boom assembly 14 further includes a winch assembly 28 which is to be coupled to a motor (not shown) for driving the winch assembly 28. Wound upon the winch assembly 28 is the lifting cable 26. The lifting cable 26 extends from the winch assembly 28 towards the pulley assembly 22 which receives the lifting cable 26. The lifting cable 26 usually includes one or more hooks 30 for lifting the wrecked object 32, when at an important distance of the main frame 12 of the wrecker 10.

There exists in the industry wreckers, such as wreckers 10, where the winch assembly 28 includes four winch assemblies and where the pulley assembly 22 includes four corresponding pulley assemblies for receiving the corresponding cables. Two of the winch/pulley assemblies may be considered to be the main winch/pulley assemblies while the two others may be considered to be the secondary winch/pulley assemblies. Such winch/pulley assemblies may be used by the operator of the wrecker 10 mainly to lift the wrecked object 32.

As shown in prior art FIGS. 1 and 2, there also exists in the industry boom assemblies 14 that are slidably mounted on main frames 12 of a wrecker 10 that is slidable between a frontmost position (prior art FIG. 1) and a rearmost position (prior art FIG. 2). Designed for most difficult operations, these slidable boom assemblies 14 bring the operator an improved usable boom assembly capacity. Such slidable boom assemblies 14 thus increase the working area of the operator of the wrecker 10 and provide him with a maximum boom lifting capacity in unusual boom working areas (prior art FIG. 3). Such a slidable boom assembly 14 may also prevent the wrecker 10 from adopting an unstable position during lifting operations.

In addition to the slidable boom assembly 14 providing the operator with one, two, three or four lifting cables 26 (via the slidable boom assembly 14) for lifting operations, some wreckers 10 that include the slidable boom assembly 14 (or that do not include it) further include a dragging cable wounded to a drag winch assembly for dragging operations.

However, such drag winch assemblies are usually mounted on a rear portion of a main frame of a wrecker. As shown in prior art FIGS. 4 and 5, a drag winch assembly 34 is mounted on a rear portion 36 of a main frame 12 of a wrecker 10. According to prior art FIGS. 4 and 5, the drag winch assembly 34 is mounted on an underlift structure 38 of the wrecker 10. Drag winch assemblies found in the industry are not configured to be mounted on a main frame of a wrecker 10 that includes a slidable boom assembly as conventional drag winch assemblies are voluminous. These drag winch assemblies generate an important weight about the rear portion of the main frame of the wrecker. Since the towing capacity of the wrecker is decreased as the load is increased above the axle of the wrecker, such a configuration is thus not recommended. Additionally, with this prior art configuration of the drag winch assembly being fixedly mounted at the rear portion of the main frame, the slidable boom assembly is not allowed to be displaced completely from its frontmost position to its rearmost position in view of the load bearing capacity of the wrecker 10 (prior art FIGS. 1 and 2).

Referring now to prior art FIG. 6, there is shown another drag winch assembly 34 mounted about a rear portion 36 of a main frame 12 of a wrecker 10. The drawbacks discussed above may also be applied to this wrecker configuration.

There is therefore a need for a drag winch assembly for a tow vehicle that includes a slidable boom assembly and for a method of operating a drag winch assembly of a tow vehicle that includes a slidable boom assembly.

SUMMARY

According to an embodiment, there is provided a drag winch assembly for a tow vehicle, the tow vehicle including a main frame and a slidable boom assembly slidably mounted to the main frame, the slidable boom assembly being slidable between a frontmost position and a rearmost position relative to the main frame. The drag winch assembly comprises: a slidable support connected to the slidable boom assembly in slidable engagement with the main frame; and a drag winch mounted on the slidable support; wherein the slidable support is slidable between a first position associated to the frontmost position of the slidable boom assembly and a second position associated to the rearmost position of the slidable boom assembly.

According to an aspect, the drag winch assembly further comprises a connector assembly configured to removably connect the slidable support to the slidable boom assembly.

According to an aspect, the connector assembly comprises a pin and hole arrangement.

According to an aspect, the slidable support is configured to conjointly move with the slidable boom assembly.

According to an aspect, the drag winch assembly further comprises a dragging cable and a drum assembly upon which the dragging cable is configured to be wound.

According to an aspect, the drag winch assembly further comprises a pulley assembly releasably receiving the dragging cable, wherein the pulley assembly is mounted on the tow vehicle distally to the second position.

According to an aspect, the drum assembly has a width, and whereby a fleet angle of the dragging cable is established by the width of the drum assembly and a position of the slidable support.

According to an aspect, the fleet angle is kept between about 7° and about 8°.

According to an aspect, the slidable support comprises slidable mating components on a bottom surface thereof for slidably operating with respect to a top surface of the main frame.

According to an aspect, the tow vehicle comprises a longitudinal direction and the drag winch is mounted at an angle relative to the longitudinal direction of the tow vehicle.

According to an embodiment, there is provided a method of operating a drag winch assembly for a tow vehicle, the tow vehicle including a main frame and a slidable boom assembly slidably mounted to the main frame, the slidable boom assembly being slidable between a frontmost position and a rearmost position relative to the main frame. The method comprises: positioning a slidable support of the drag winch assembly connected to the slidable boom assembly in slidable engagement with the main frame to slide at an operating position between the frontmost position and the rearmost position.

According to an aspect, the positioning the slidable support comprises determining the operating position to have a fleet angle in an operational range.

According to an aspect, the method further comprises: disconnecting the slidable support from the slidable boom assembly; and removing the drag winch assembly from the tow vehicle, whereby load of the tow vehicle is decreased while maintaining the slidable boom assembly in an operating configuration.

According to an embodiment, there is provided a drag winch assembly for a tow vehicle, the tow vehicle including a main frame. The drag winch assembly comprising: a slidable support in slidable engagement with the main frame; and a drag winch mounted on the slidable support; wherein the slidable support is slidable between a frontmost position relative to the main frame and a rearmost position relative to the main frame.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
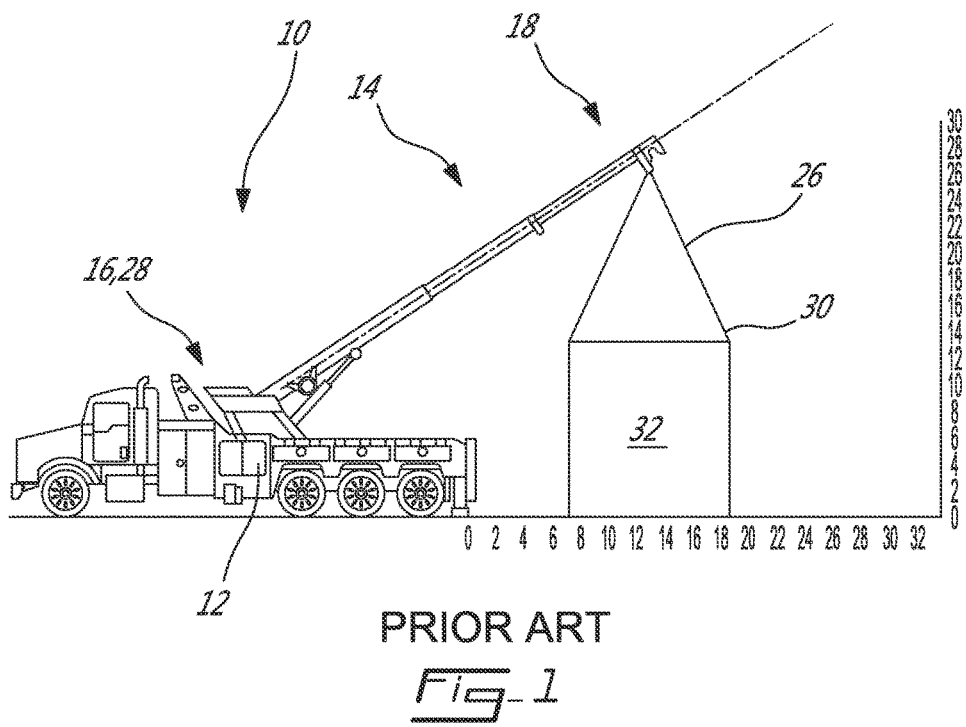
FIG. 1 is a side elevation view of a wrecker in accordance with the prior art, where the slidable boom assembly is shown in its frontmost position.
Figure 2:
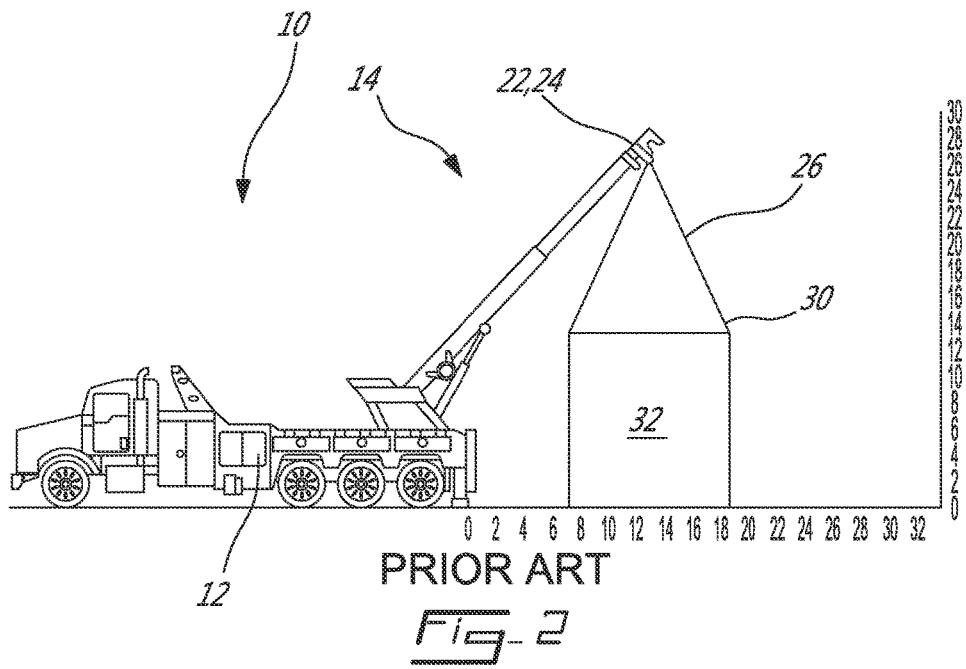
FIG. 2 is a side elevation view of the wrecker of prior art FIG. 1, where the slidable boom assembly is shown in its rearmost position.
Figure 3:
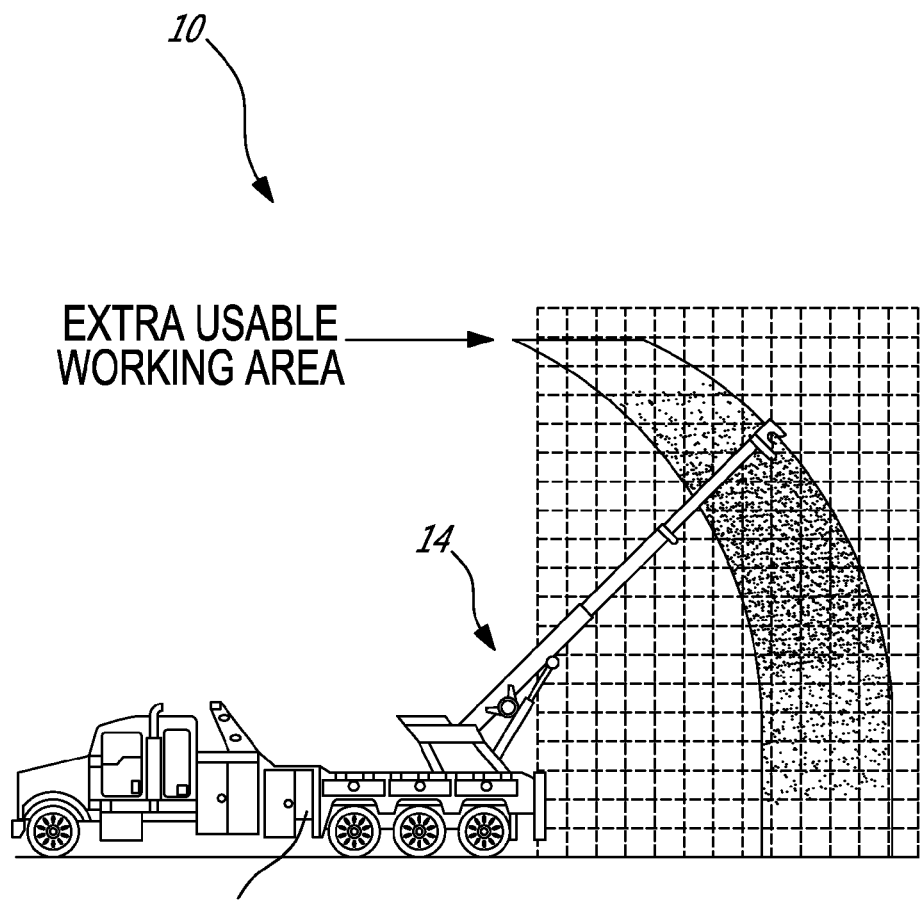
FIG. 3 illustrates the improved usable slidable boom assembly capacity of the wrecker shown in prior art FIGS. 1 and 2.
Figure 4:
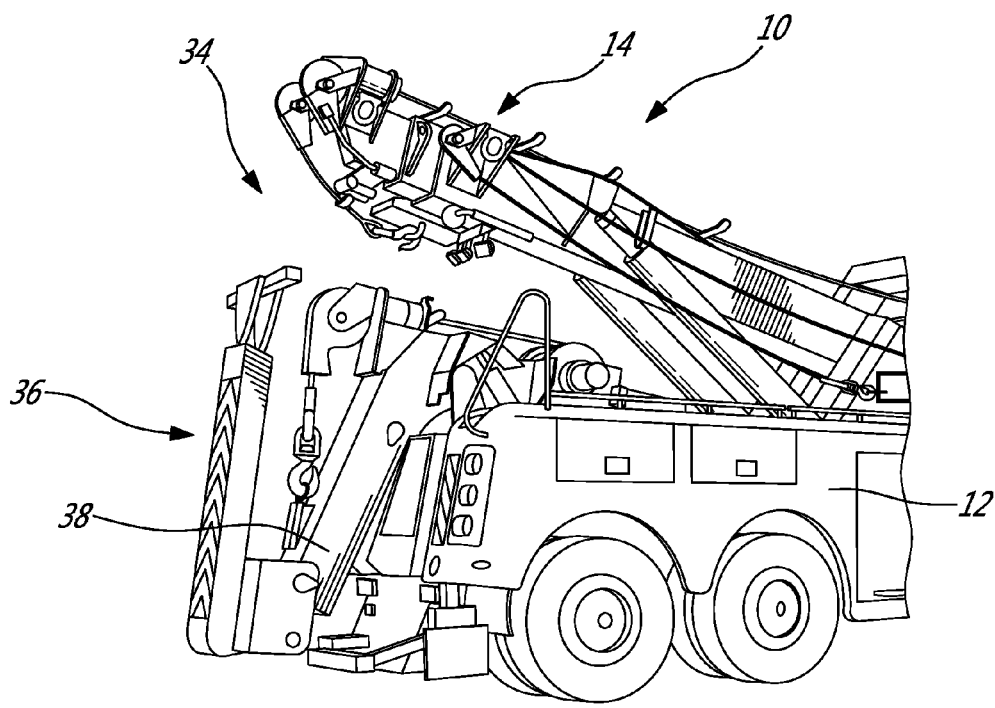
FIG. 4 is a schematic showing a drag winch assembly mounted about a rear portion of a main frame of a wrecker in accordance with the prior art.
Figure 5:
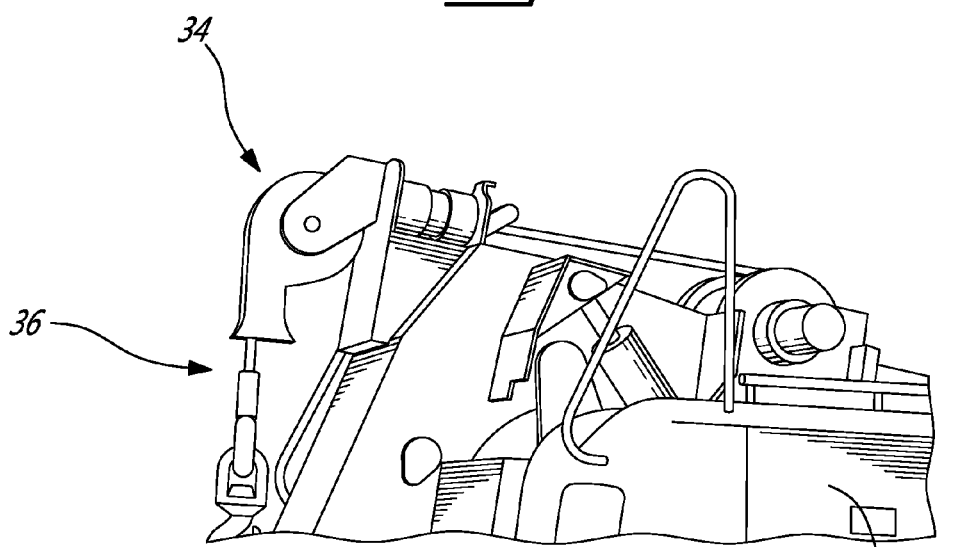
FIG. 5 is a schematic showing a close-up view of the drag winch assembly of prior art FIG. 4.
Figure 6:
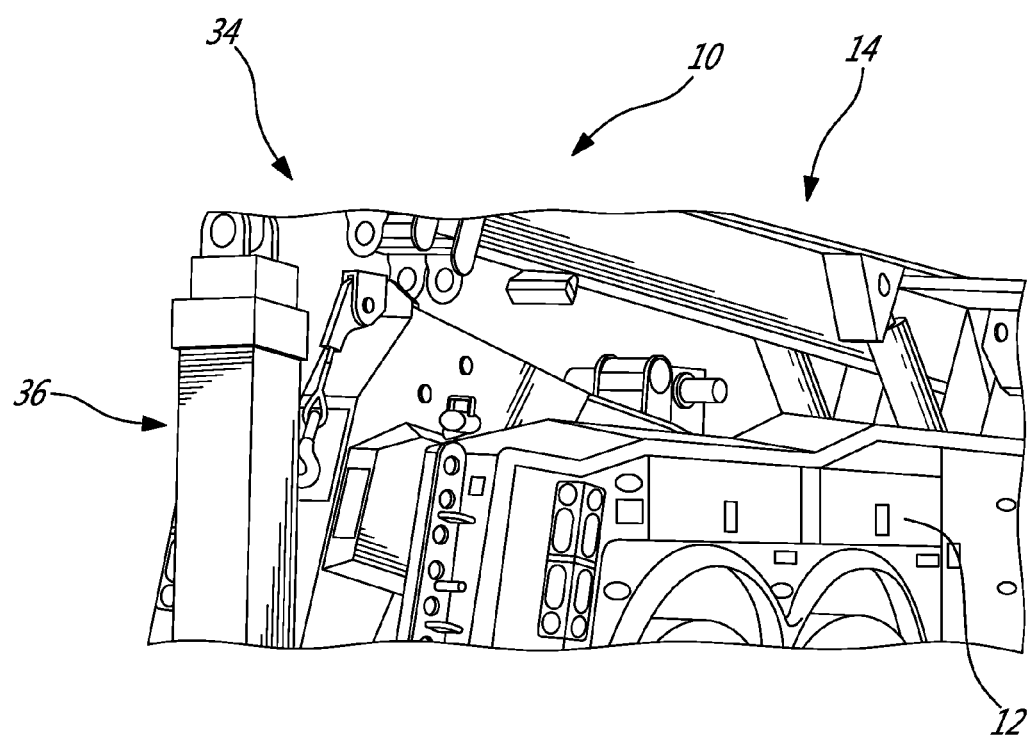
FIG. 6 is a schematic showing another drag winch assembly mounted about a rear portion of a main frame of a wrecker in accordance with the prior art.
Figure 7:
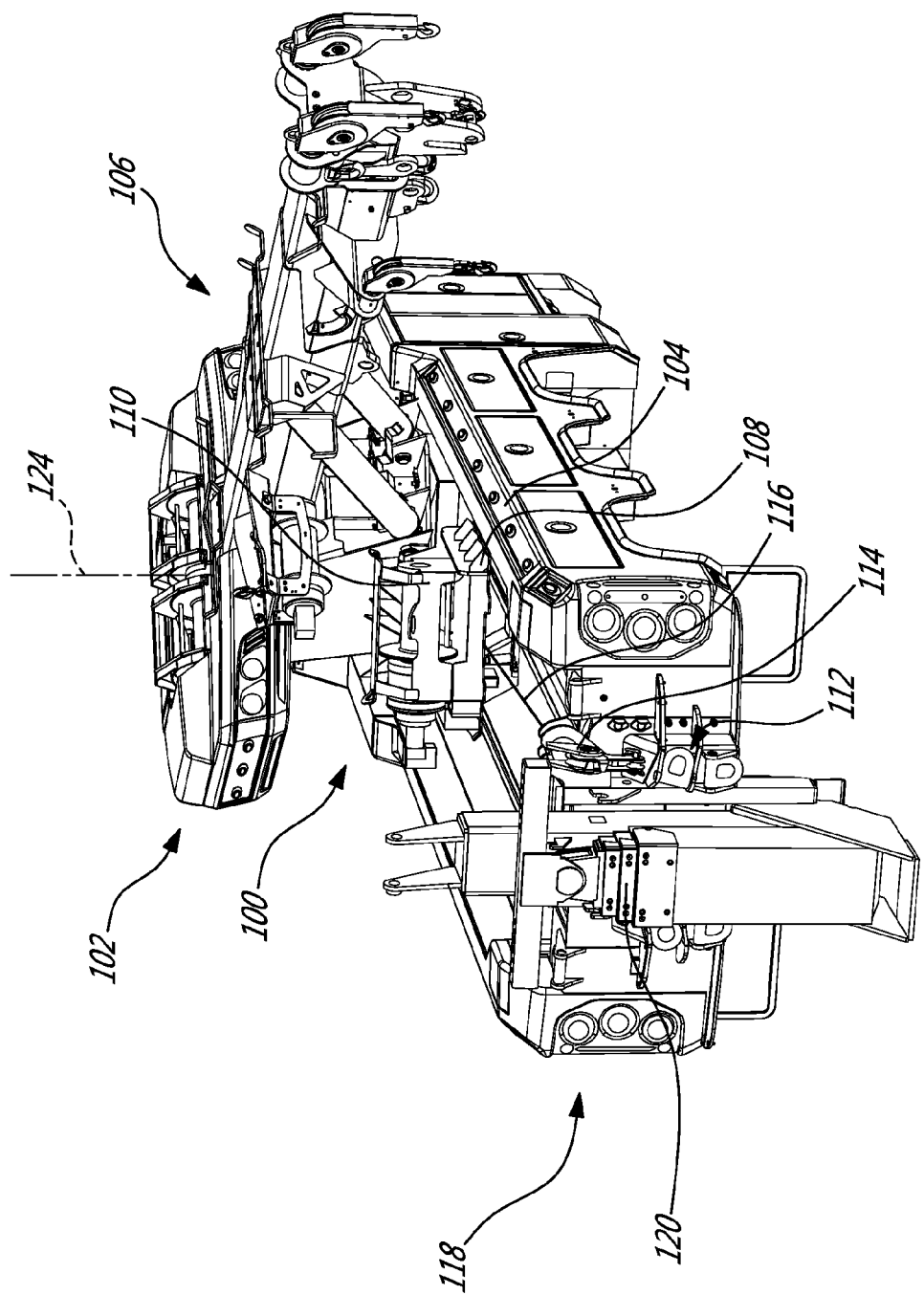
FIG. 7 is a rear perspective view of a wrecker in accordance with an embodiment, showing the slidable boom assembly in its frontmost position.
Figure 8:
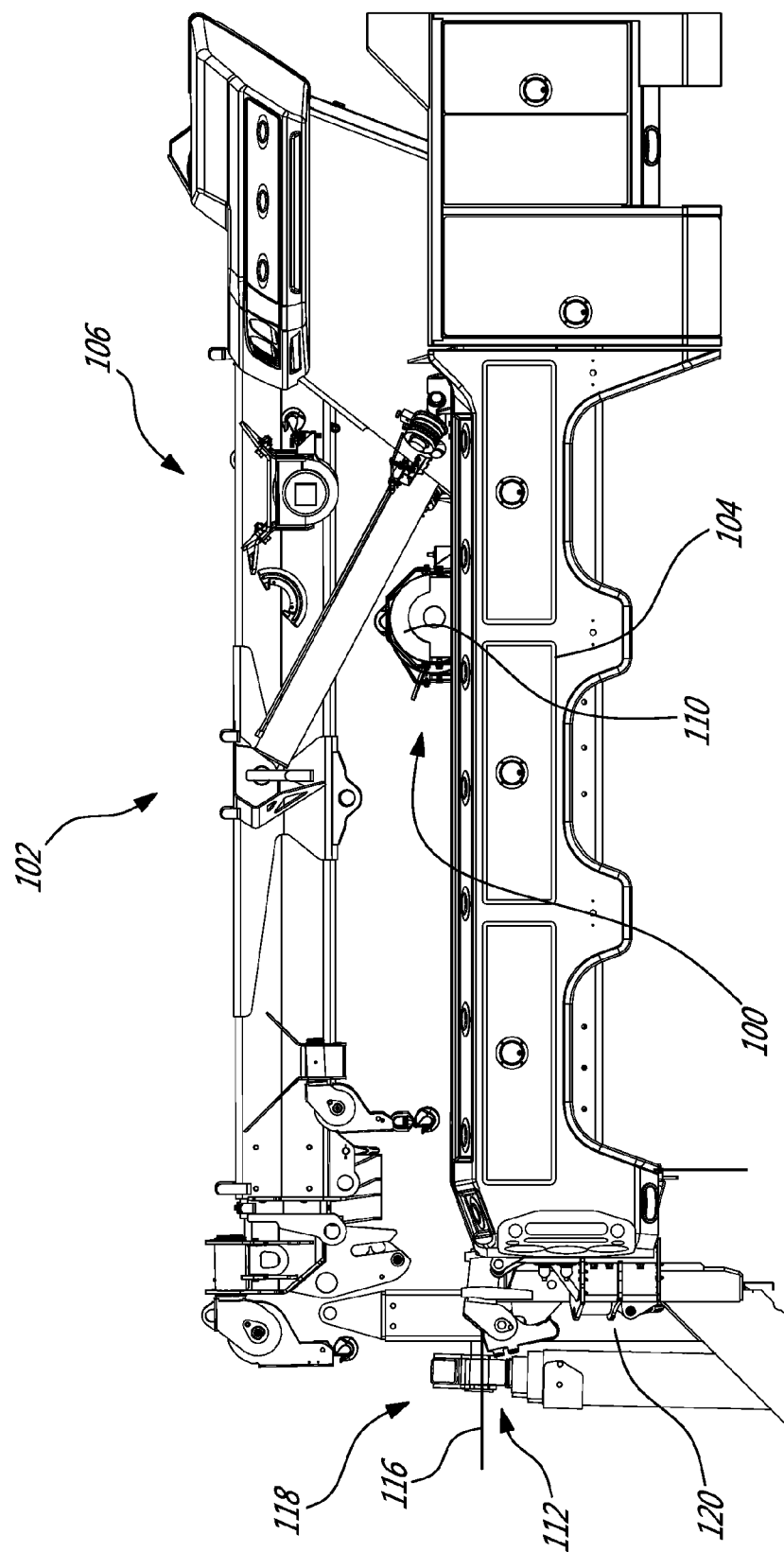
FIG. 8 is a side elevation view of the wrecker of FIG. 7, showing the slidable boom assembly in its frontmost position.
Figure 9:
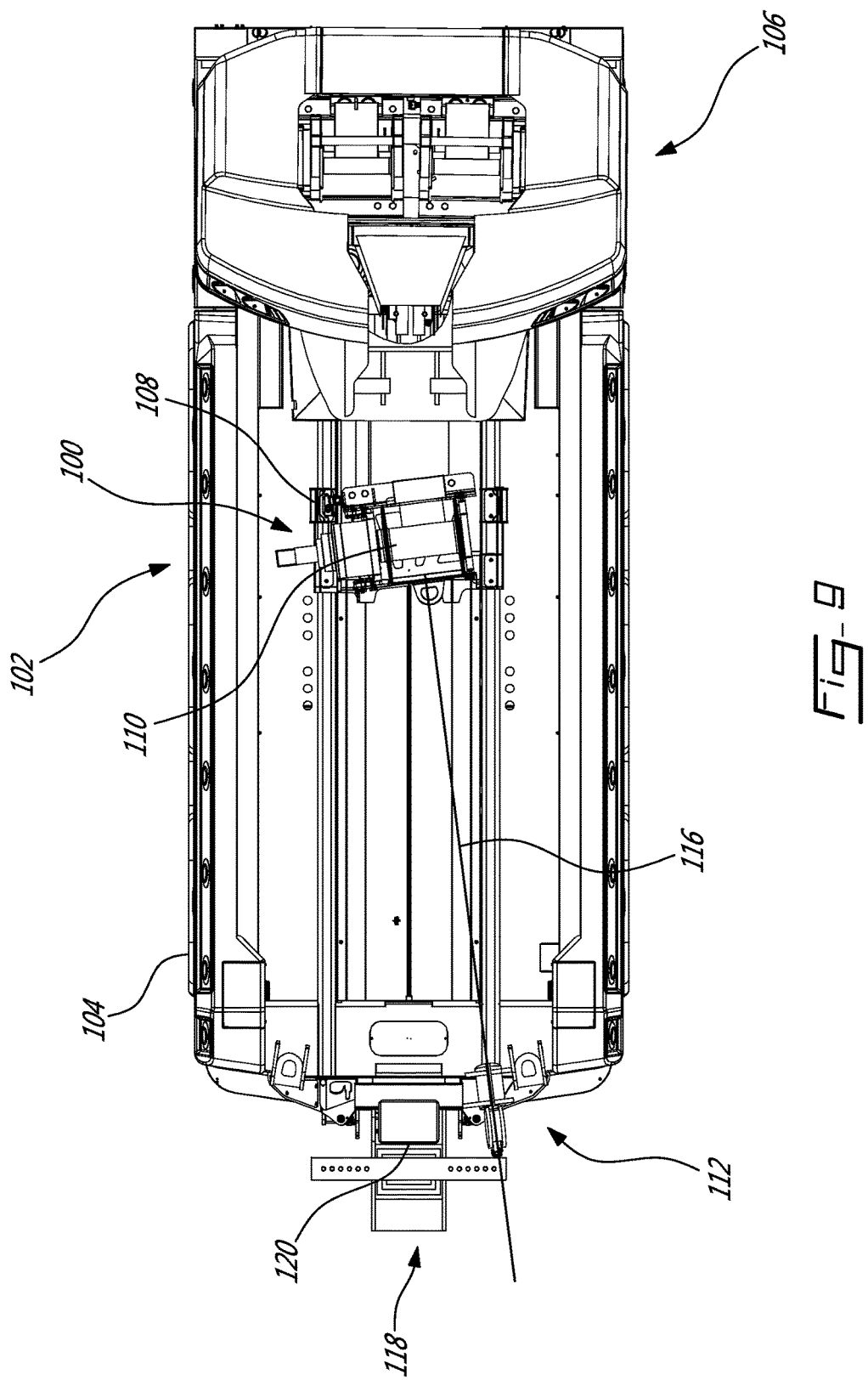
FIG. 9 is a top plan view of the wrecker of FIG. 7, showing the slidable boom assembly in its frontmost position.
Figure 10:
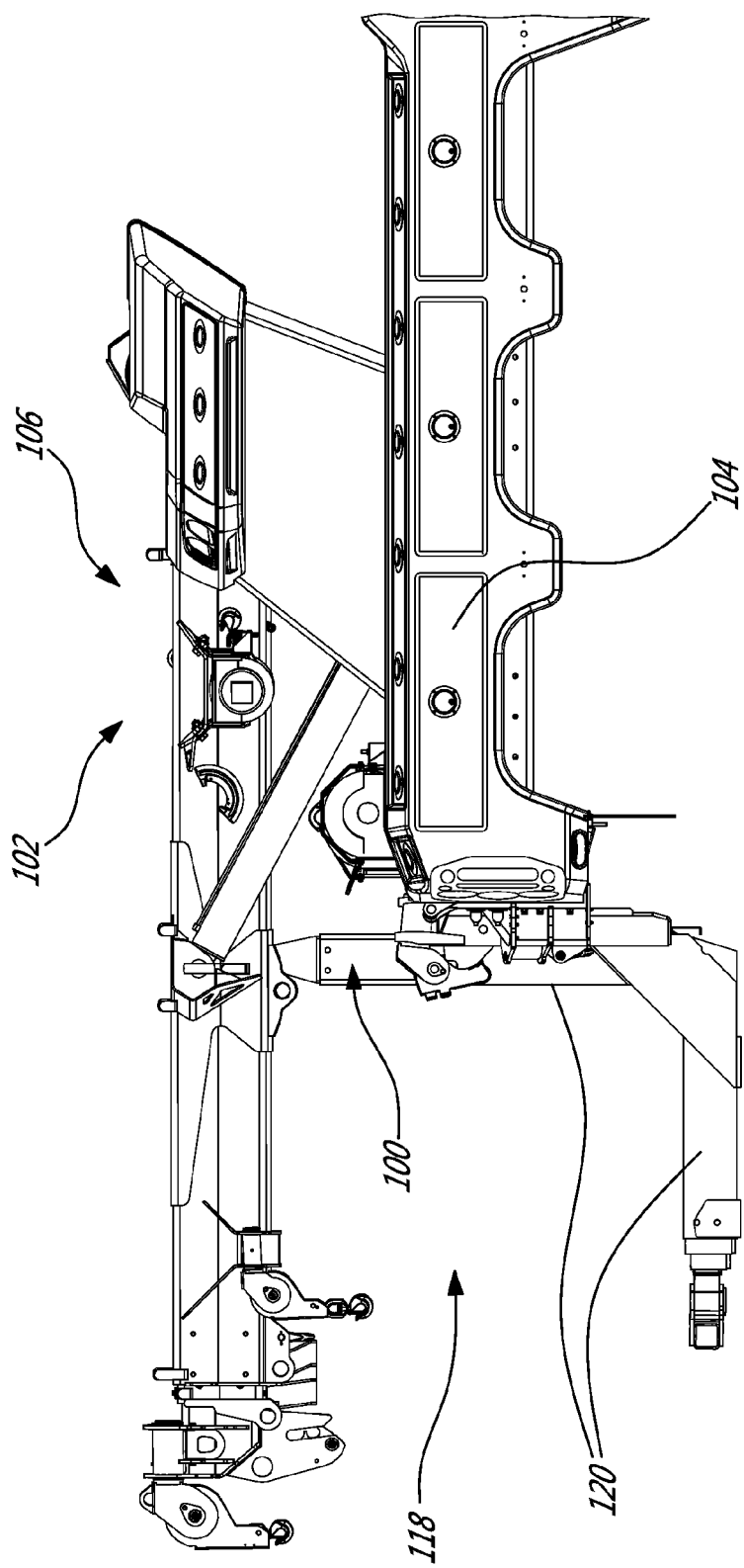
FIG. 10 is a side elevation view of the wrecker of FIG. 7, showing the slidable boom assembly in its rearmost position.

In embodiments there are disclosed drag winch assemblies for tow vehicles or wreckers that include a slidable boom assembly and methods of operating drag winch assemblies on tow vehicles that include a slidable boom assembly.

Referring now to the drawings, and more particularly to FIGS. 7-12, there is shown a drag winch assembly 100 slidably (and optionally releasably) mounted on a tow vehicle, namely a wrecker 102. As shown, the wrecker 102 includes a main frame 104 and a slidable boom assembly 106 which is slidably mounted to the main frame 104. The slidable boom assembly 106 is slidable between a frontmost position (FIGS. 7, 8 and 9) and a rearmost position (FIGS. 10 and 11) relative to the main frame 104. The drag winch assembly 100 includes a slidable support 108 which is connected to the slidable boom assembly 106. The slidable support 108 is in a slidable engagement with the main frame 104. It is to be noted that the slidable support 108 may be fixedly or releasably mounted to the slidable boom assembly 106 and/or to the main frame 104. The drag winch assembly 100 further includes a drag winch 110 which is mounted on the slidable support 108. Again, it is to be noted that the drag winch 110 may be fixedly or releasably mounted to the slidable support 108. The drag winch assembly 100 shown in FIGS. 7-12 shows the slidable support 108 to be slidable between a first position (FIGS. 7, 8 and 9) corresponding to the frontmost position of the slidable boom assembly 106 and a second position (FIGS. 10 and 11) corresponding to the rearmost position of the slidable boom assembly 106.

According to an embodiment, the drag winch assembly 100 further operates in combination with a pulley assembly 112 which is rotatably mounted about a pulley axis 114 for receiving a dragging cable 116. As better shown in FIGS. 7, 8, 9 and 11, the pulley assembly 112 is rotatably mounted about a rearmost portion 118 of the main frame 104 of the wrecker 102 and about the pulley axis 114. As shown, the pulley assembly 112 is rotatably mounted on an underlift 120 mounted about the rearmost portion 118 of the main frame 104 of the wrecker 102. It is to be noted that the pulley assembly 112 may be mounted on the main frame 104 about the underlift 120 or in another configuration which provide to the dragging cable 116 a direct and free trench or space to the drag winch assembly 100. Contrary to the lifting cable that is fixedly received within the slidable boom assembly 106, the dragging cable 116 may be releasably attached to the pulley assembly 112. Accordingly, the operator of the wrecker 102 may decide to remove the dragging cable 116 from its attached position (with the pulley assembly). The pulley assembly 112 may then include a channel (not shown) for allowing the dragging cable 116 to be released.

The drag winch 110 includes a drum assembly 122 which is to be coupled to a motor (not shown) for driving the drum assembly 122. Wound upon the drum assembly 122 is the dragging cable 116. The dragging cable 116 extends from the drum assembly 122 towards the pulley assembly 112 which receives the dragging cable 116. The dragging cable 116 may include one or more hook(s) at its end for dragging the wrecked object towards the main frame 104 of the wrecker 102.

Figure 11:
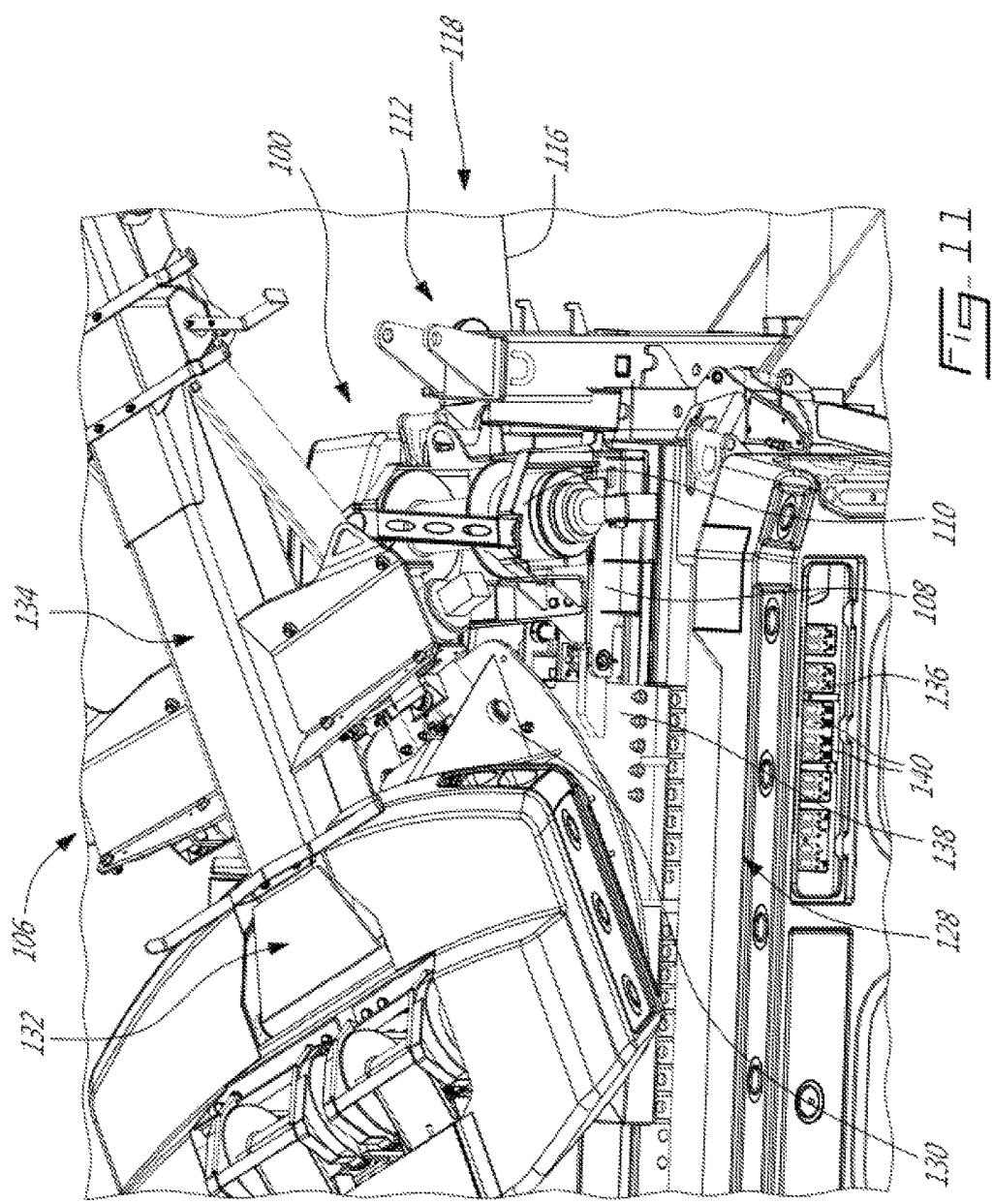
FIG. 11 is a perspective close-up view of a drag winch assembly connected to the slidable boom assembly of the wrecker of FIG. 7, showing the drag winch assembly in its rearmost position (or second position)
Figure 12:
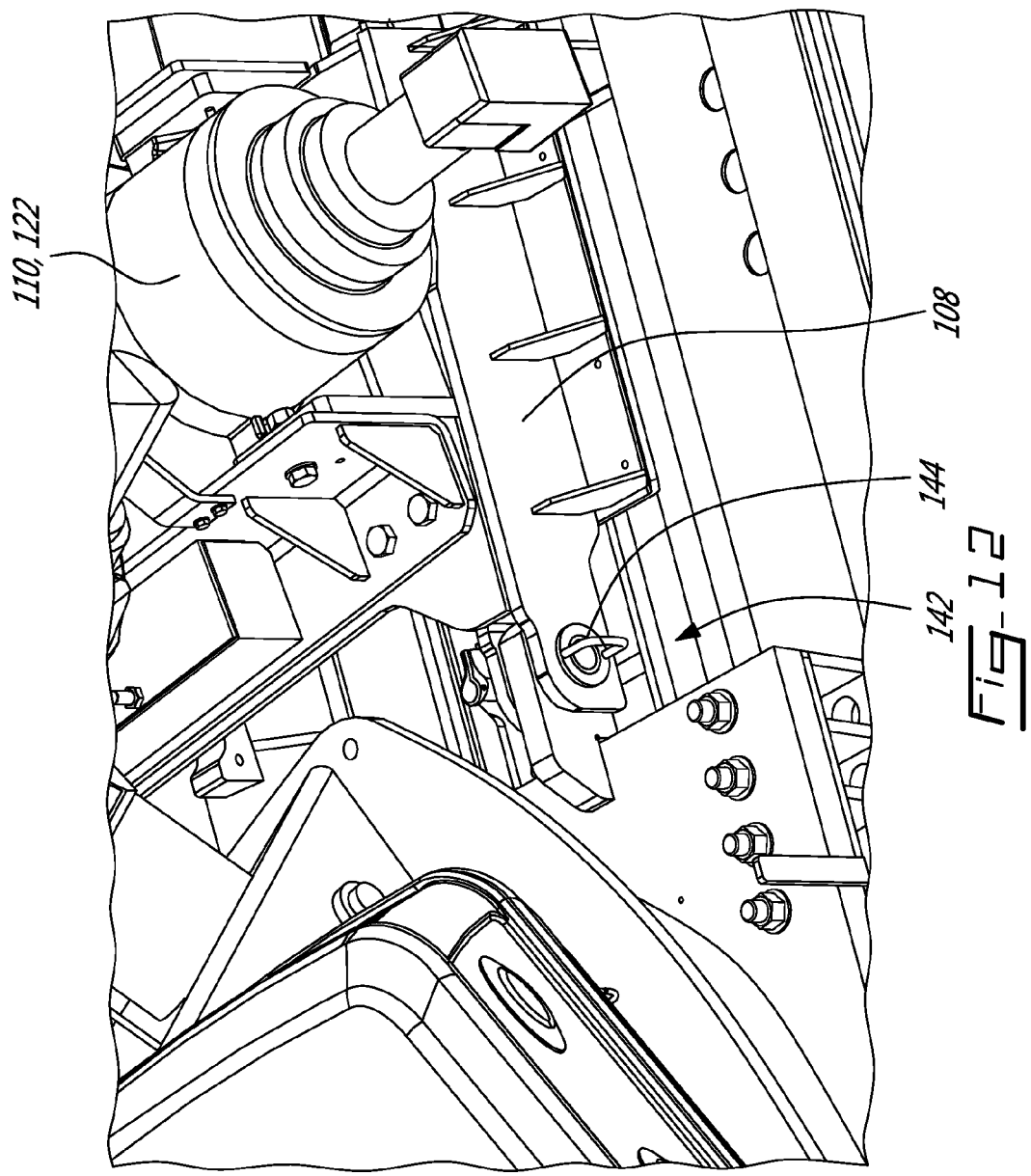
FIG. 12 is a close-up view of the drag winch assembly of FIG. 11 connected to the slidable boom assembly.
Figure 13:
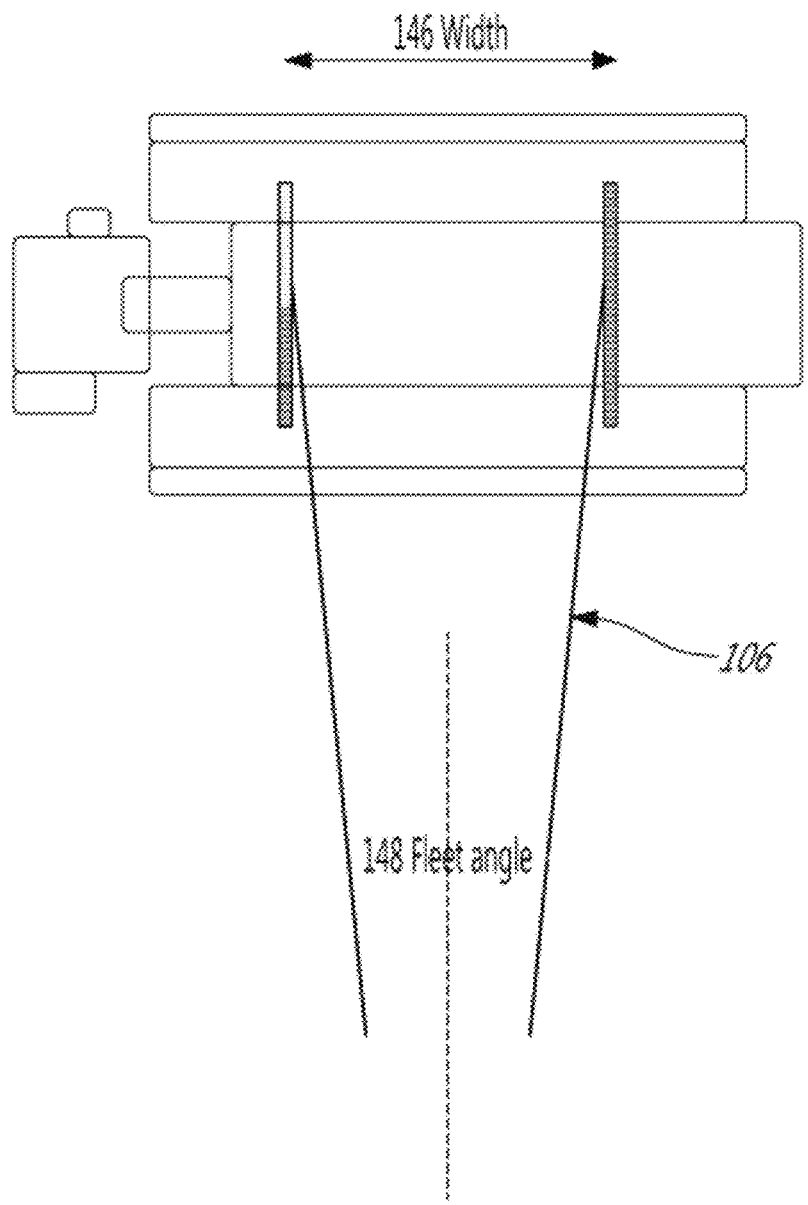
FIG. 13 is a top view of the drag winch assembly according to an embodiment.

As better shown in FIGS. 11 and 12, the slidable boom assembly 106 includes a sliding base 128 which is slidably mounted on the main frame 104. As mentioned above, the sliding base 128 is capable of displacement relative to the main frame 104 between a frontmost position and a rearmost position. The slidable boom assembly 106 further includes a pivoting base 130 which is pivotably mounted on the sliding base 128. As mentioned above, the pivoting base 130 is capable of pivoting clockwise and counterclockwise about the boom vertical axis 124 and relative to the sliding base 128. The pivoting base 130 receives a boom end 132 of a boom 134.

Still referring to FIGS. 11 and 12, there is shown that the slidable support 108 is connected to the sliding base 128. According to this configuration, when the sliding base 128 slides in a forward direction (i.e., from the rearmost position of the slidable boom assembly 106 to the frontmost position of the slidable boom assembly 106), then the slidable support 108, which is connected to the sliding base 128, also slides in the forward direction (i.e., from the second position or rearmost position of the drag winch assembly 100 to the first position or frontmost position of the drag winch assembly 100).

The slidable support 108 of the drag winch assembly 100 and the sliding base 128 of the slidable boom assembly 106 may each include slidable mating components on their respective bottom surface for slidably operating with respect to a top surface of the main frame 104 of the wrecker 102. Such components may consist in travel frame tubes on wear pads or bronze bearing pads or rollers.

It is to be understood that the slidable support 108 of the drag winch assembly 100 and/or the sliding base 128 of the slidable boom assembly 106 may adopt any configuration such as, as illustrated on FIGS. 7 to 12, to be conjointly moveable between the rearmost position and the frontmost position of the slidable boom assembly 106 (corresponding to a displacement between the second position and the first position of the drag winch assembly 100).

As better shown in FIGS. 11-12, the slidable support 108 of the drag winch assembly 100 and the sliding base 128 of the slidable boom assembly 106 are releasably connected via two connector assemblies 142 extending between the slidable support 108 and the sliding base 128. Each connector assembly 142 includes one or more pin(s) 144 for connecting the slidable support 108 and the sliding base 128 together. It is to be mentioned that each connector assembly 142 may adopt any suitable configuration for releasably connecting the slidable support 108 with the sliding base 128. The releasable nature of the slidable support 108 of the drag winch assembly 100 as illustrated, via the nature of the connector assemblies 142, and its removable nature with respect to the main frame, allows the operator of the wrecker 102 to remove the drag winch assembly 100 from the main frame 104 when it is not needed, or when the cumulated load on the main frame 104 needs to be reduced (i.e., during spring thawing periods). An alternative, not illustrated, includes the use of similar components for releasably connecting the drag winch 110 to the slidable support 108.

Designed for most difficult operations, the wrecker 102 described above, which includes both a slidable boom assembly 106 and a drag winch assembly 100 connected to the slidable boom assembly 106, brings the operator an improved usable boom assembly capacity and the possibility of keeping almost the entire length of the main frame 104 for sliding the slidable boom assembly 106 between its rearmost and frontmost positions. Such drag winch assembly 100 thus provides the slidable boom assembly 106 to increase the working area of the operator of the wrecker 102 and provides him with a maximum boom lifting capacity in unusual boom working areas. Such a configuration of the wrecker 102 as described above may further prevent the wrecker 102 from adopting an unstable position during lifting operations.

Accordingly, the slidable boom assembly 106 of the wrecker 102 may include four winch assemblies and four corresponding pulley assemblies for receiving the four corresponding lifting cables. Two of the winch/pulley assemblies may be considered to be the main winch/pulley assemblies while the two others may be considered to be the secondary winch/pulley assemblies. Such winch/pulley assemblies may be used by the operator of the wrecker 102 mainly to lift the wrecked object.

The wrecker 102 as described above thus further include a fifth winch assembly, the drag winch assembly 100, for supporting dragging operations. The dragging cable 116 may be longer than the lifting cables for providing the operator of the wrecker 102 with improved usable drag winch capacity. In order to wind a longer dragging cable 116, the width of the drum assembly 122 may be greater than the width of the drum assemblies on which are wound lifting cables.

Since the towing capacity of the wrecker 102 decreases with the increase of the load is above the axle of the wrecker 102, the drag winch assembly 100 being slidable with the slidable boom assembly 106 increases the resulting towing capacity of the wrecker 102.

Furthermore, having the drag winch assembly 100 attached to the slidable boom assembly 106 offers the operating resistance for dragging heavy loads without requiring the drag winch assembly 100 to be fixedly mounted on the main frame 104.

The drag winch assembly 100 described above provides a sufficient distance between its drum assembly 122 and its pulley assembly 112 (receiving the dragging cable 116) to maintain an operational fleet angle. Accordingly, because the drag winch assembly 100 can reach the frontmost position on the main frame 104, it allows decreasing the operating fleet angle into an acceptable fleet angle range. The fleet angle of the dragging cable 116, according to the present configuration, may be about between about 7° and 8°. Additionally, from the nature of the drag winch assembly 100, the drag winch 110 allows to have a drum assembly 122 that may be wider than conventional drum assemblies, and thus capable of receiving a longer dragging cable 116 while still having the fleet angle respecting an operational range.

The method of operating the drag winch assembly 100 comprises positioning the slidable support 108 of the drag winch assembly 100 at an operating position among the frontmost position, the rearmost position and one therebetween. The method further comprises attaching the end (featuring one or more hooks) of the dragging cable 116 to an object or vehicle, and operating the drag winch assembly 100 thereby pulling the object toward the wrecker 102.

The method of preparing the wrecker for low load condition comprises releasing the slidable support 108 of the drag winch assembly 100 from the slidable boom assembly 106, and removing the drag winch assembly 100 from the wrecker 102. Thereby, the load of the wrecker 102 is temporarily decreased while maintaining the slidable boom assembly 106 in an operating condition moveable to the frontmost position and the rearmost position.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A tow vehicle for lifting and dragging wrecked objects, the tow vehicle comprising:
   a main frame;
   a slidable boom assembly comprising a lifting cable for lifting the wrecked objects, the slidable boom assembly being slidably mounted to the main frame; and
   a drag winch assembly comprising:
      a slidable support in slidable engagement with the main frame and slidable between a frontmost position and a rearmost position relative to the main frame;
      a dragging cable for dragging wrecked objects;
      a motor;
      a drag winch mounted on the slidable support, the drag winch further comprising a drum assembly upon which the dragging cable is configured to be wound, wherein the drum assembly is coupled to the motor for driving the drum assembly independently from the lifting cable of the slidable boom.

2. The tow vehicle of claim 1, wherein the slidable support is configured to conjointly move with the slidable boom assembly.

3. The tow vehicle of claim 1, wherein the dragging cable extends horizontally from the drum assembly.

4. The tow vehicle of claim 3, further comprising a pulley assembly releasably receiving the dragging cable, wherein the pulley assembly is mounted to the main frame distally to the frontmost position.

5. The tow vehicle of claim 4, further comprising a longitudinal axis, and wherein the pulley assembly is statically mounted relative to the longitudinal axis.

6. The tow vehicle of claim 5, wherein, by moving the slidable support between the rearmost position and the frontmost position, fleet angle of the drag which assembly is decreased.

7. The tow vehicle of claim 1, further comprising a connector assembly configured to removably mount the slidable support to the slidable boom assembly.

8. The tow vehicle of claim 7, wherein the connector assembly comprises a pin and hole arrangement.

\* \* \* \* \*